Figure 1:
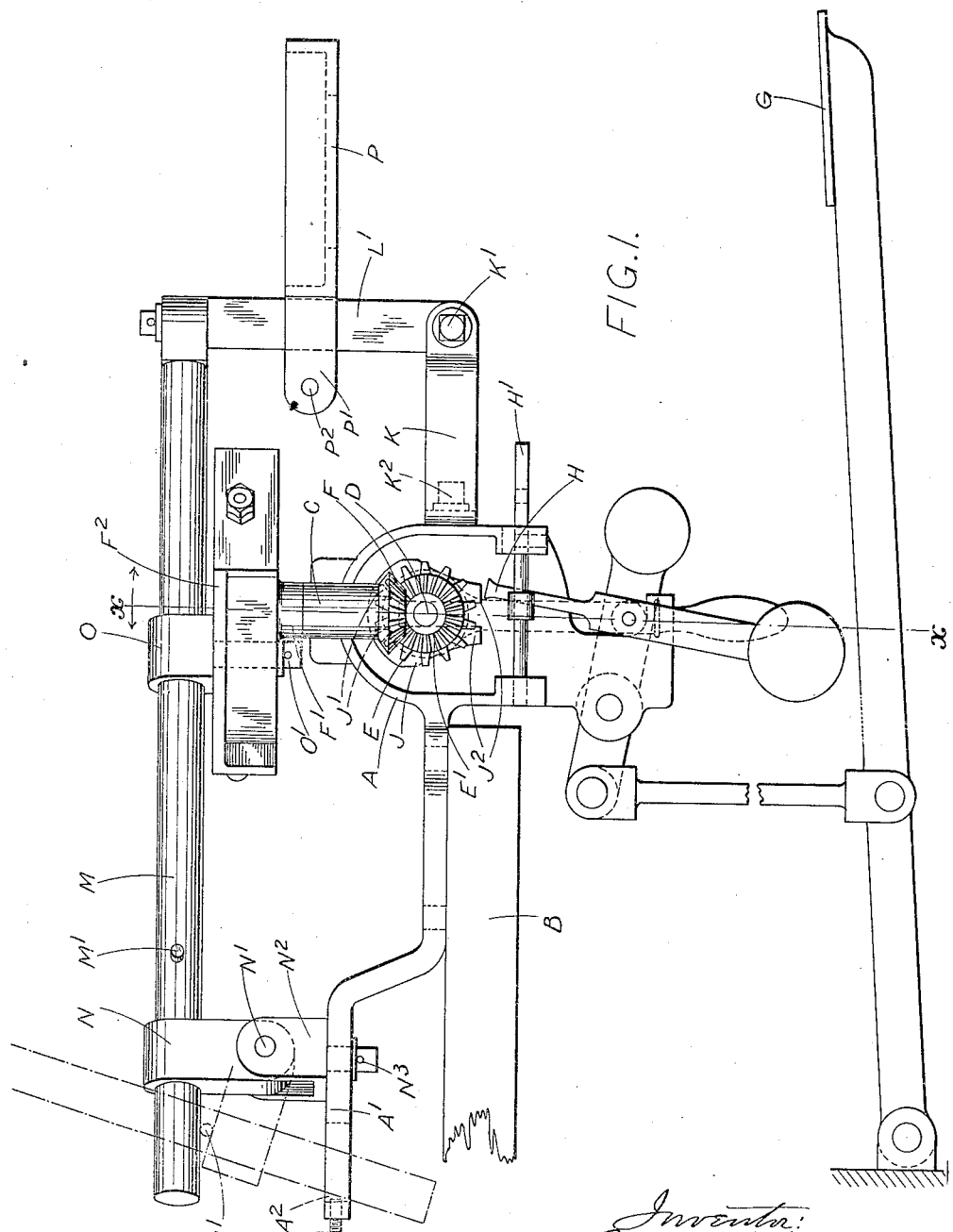

A. R. J. WILKINSON.
WORK HOLDING DEVICE.
APPLICATION FILED SEPT. 18, 1918.

1,337,677.

Patented Apr. 20, 1920.
4 SHEETS—SHEET 4.

FIG. 4.

UNITED STATES PATENT OFFICE.

ALBERT RICHARD JAMES WILKINSON, OF TWICKENHAM, ENGLAND.

WORK-HOLDING DEVICE.

1,337,677. Specification of Letters Patent. Patented Apr. 20, 1920.

Application filed September 18, 1918. Serial No. 254,688.

*To all whom it may concern:*

Be it known that I, ALBERT RICHARD JAMES WILKINSON, a subject of the King of England, and residing at Twickenham, Middlesex, in England, have invented certain new and useful Improvements in Work-Holding Devices, of which the following is a specification.

This invention relates to work holding and like devices and has for its object to provide a reciprocating or traversing device of this nature adapted to be employed or combined with an adjustable vise of the type described in the specification of the present inventor's application for British Letters Patent No. 14,739 of 1917.

The essential features of the apparatus described in the prior specification referred to comprise a fixed bracket on which a member is so mounted that its angle of inclination relatively to the bracket can be adjusted, and a table, on which may be a vise or the like, rotatably carried on the adjustable member, while treadle-operated mechanism is provided by means of which the table can be rotated irrespective of the position in which the adjustable member is set.

According to this invention a frame or carriage which constitutes or carries a work holder or the like is so constructed and arranged on or over the adjustable member and connected to the table in the above-described apparatus that as the table rotates the carriage will be caused to travel to and fro relatively to the adjustable member. The carriage is mounted in a detachable manner and moved above or beside the table, and the reciprocating or traversing movement of the carriage is brought about by means of a crank-pin on the table and a connection between this pin and the carriage. The carriage is conveniently hinged at one side so that it can be lifted clear of the table beneath it when it is desired to employ the vise or the like which may be mounted on the table. The connection between the carriage and the crank-pin on the table is a detachable one of such a nature that when the carriage is raised or turned about its hinge it will be disconnected from the crank-pin, and conversely when the carriage is lowered into position over the table it will be automatically coupled to the table so that as the latter rotates the carriage will be caused to travel to and fro. The manner in which the table is coupled to the carriage so that the rotational movement of the one is converted into reciprocating movement in the other may vary, but a convenient device which may be employed comprises a crank-pin on the table which is connected to a member which slides on a part of the carriage or which engages a slot in a member carried by or forming part of the carriage.

Figure 2:
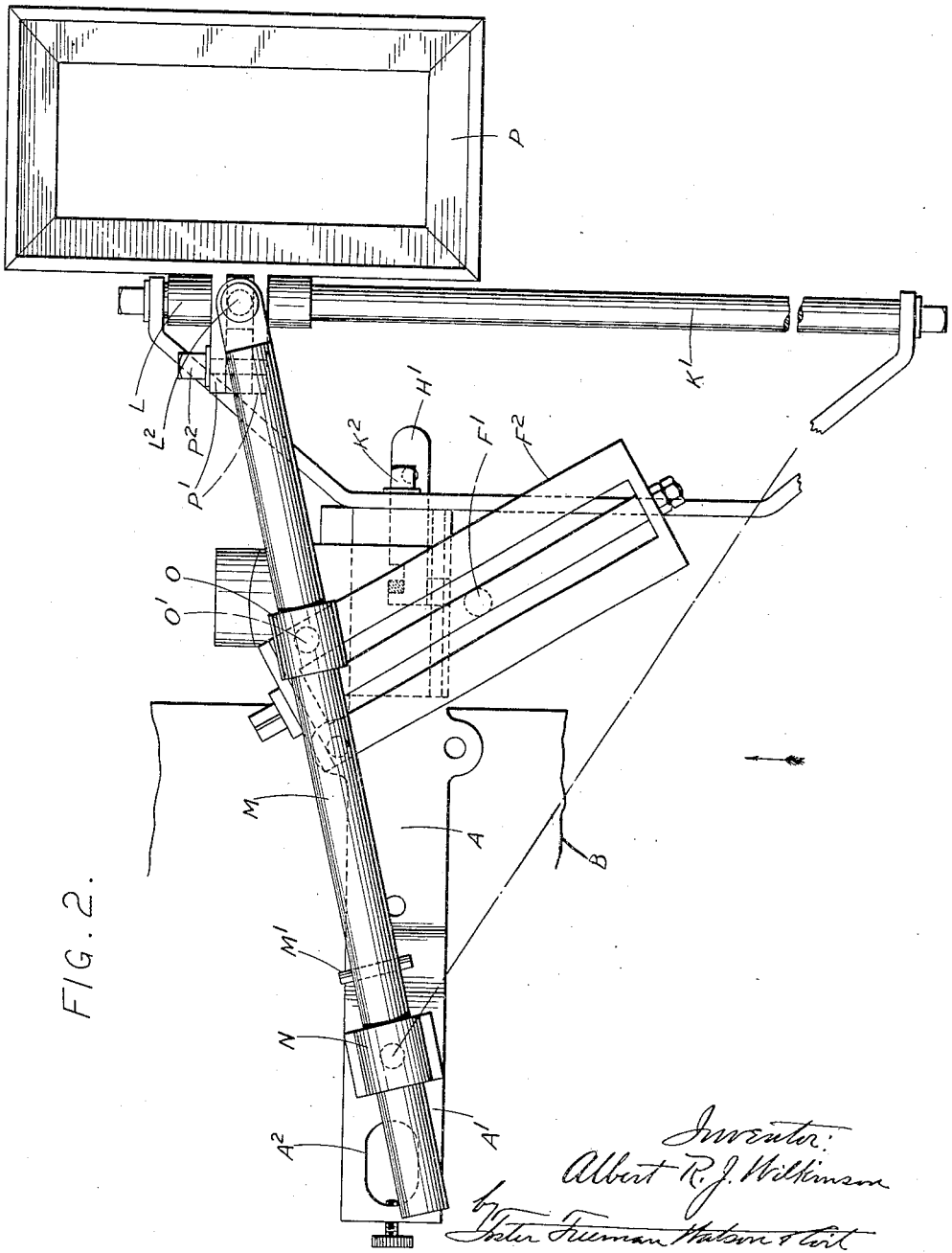
Figure 3:
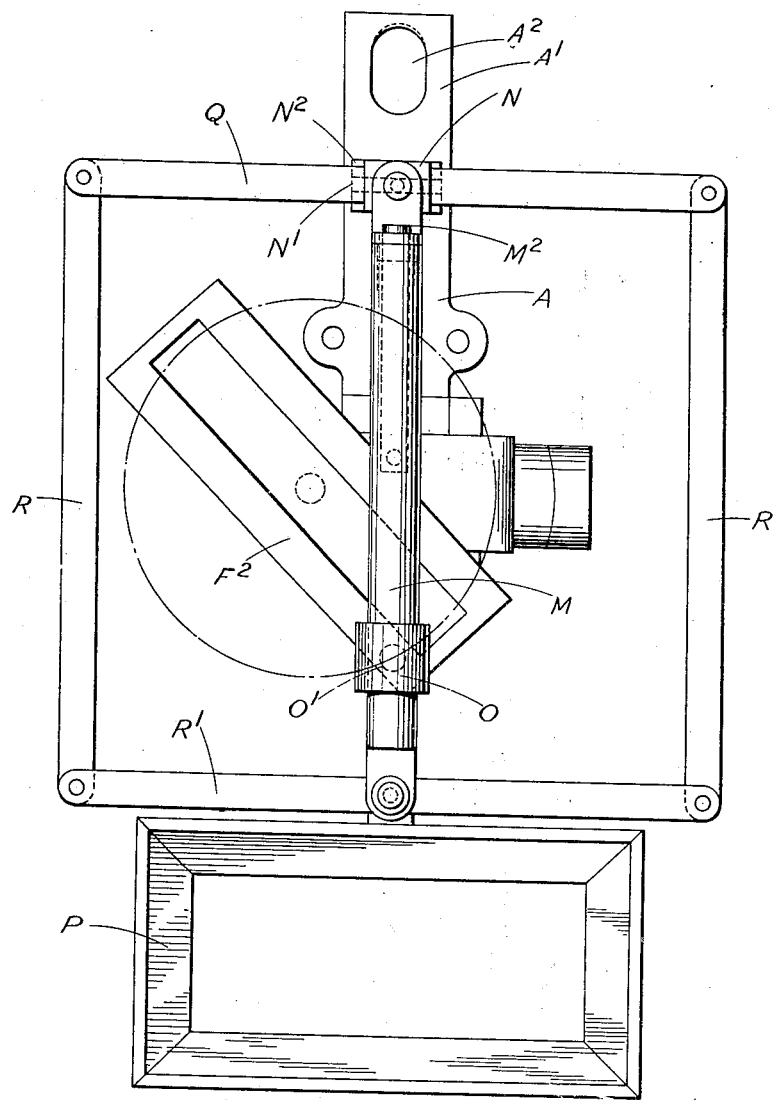

The invention may be put into practice in various ways, and the accompanying drawings illustrate two alternative constructions by way of example. In these drawings, Figure 1 is a side elevation of one construction of the improved work holding device, Fig. 2 is a plan of the same, Fig. 3 is a plan of a modified and simpler construction, and Fig. 4 is a front elevation of the construction shown in Figs. 1 and 2.

Like letters indicate like parts throughout the drawings.

The constructions shown are more particularly intended for use in the holding of tubular or other parts which require brazing or similar treatment. By mounting the work so that it can travel past the operator more satisfactory results can be obtained and the work executed in a more speedy manner than as heretofore when the work remained fixed and the operator had to move over to it. For instance in welding parts by oxy-acetylene or like processes a more satisfactory result can be obtained if the work is caused to travel without interrupting the application of the flame than if it is necessary for the operator to stop the process and shift the work or move along it.

The apparatus to which the present improvement is applied comprises a bracket A which is fixed on a bench B. The bracket A has an adjustable member C carried by a flange C' angularly adjustable about a hollow shaft D. The movable member is locked in the desired position by means of a cam D' working between the flange C' and a fixed sleeve $D^2$, the cam having an operating lever $D^3$. On the hollow shaft D is loosely mounted a sleeve $E^2$ having a ratchet wheel E keyed to one end and a bevel pinion E' to the other. The pinion E' meshes with a similar pinion F secured to a shaft F' mounted to rotate in the adjustable portion C of the bracket A and carrying at its upper end a table $F^2$ or the like (only partly shown in Fig. 4). When the locking handle D³ is operated to release the cam D' the whole adjustable member together with the table F², shaft F', and pinion it carries, can be angularly adjusted about the center line $x$—$x$ (shown in Fig. 1) and then locked in the required position by the coöperation of the cam D' with the inclined face of the sleeve D². By means of a treadle G a detent or pawl H is caused to act on the toothed wheel E so as to impart a step-by-step rotation to the sleeve and bevel wheel E' and through the latter and the bevel wheel F to the table F² carried on the adjustable member C. The pawl H can be thrown by means of the sliding bar H' from one side to the other of the center of the ratchet wheel E so as to act on this wheel in a manner which will cause its rotation either in one direction or the other. A vertically sliding plate J having lateral projections J' adapted to engage the ratchet wheel E constitutes a locking device, and the lower part J² of this plate can be acted on and lifted by the pawl H so that the ratchet wheel E and the table F² will be held rigidly when the pawl is not actually in engagement with the wheel E so as to rotate it. The table may carry a vise or the like.

The carriage comprised in the present improvement is so pivotally mounted or hinged that it can be either lifted clear of the table F² and if necessary detached when it is desired to use the vise, or the carriage can be lowered when it will lie above or at the side of the table and be available to support the work to be operated on. When so lowered the carriage is coupled to the rotatable table F² so that as the treadle mechanism is operated the table will be rotated and the carriage will be reciprocated.

In the construction illustrated in Figs. 1 and 2 a wide U-shaped frame K is rigidly connected to the front part of the bracket A and carries between its arms a guide rod K'. On this rod is a sliding sleeve L to which is rigidly attached an upwardly directed and preferably flat bar L' on the upper end L² of which is pivoted one end of a rod M which extends backward over the rotatable table F². The rear end passes through and can freely reciprocate in a block N which is pivoted at N' in a forked lug N² which can turn about the vertical pivot N³ on an upturned and rearward extension A' of the fixed bracket A. Freely sliding on the rod M is a block O which carries a pin O' which is adapted to engage a hole suitably formed in the table F². This pin constitutes a crank-pin connection between the rod M and the table F² such that as the table is rotated by the treadle mechanism in either direction the sleeve L and bar L' will be caused to reciprocate on the guide rod K'. A tray P or other form of work-holder is mounted on the bar L', the tray for this purpose being provided with two parallel projections P' which lie on either side of the bar L' and can be caused to grip it by means of a bolt P². By means of this device the tray P can be fixed to the bar L' at any height and at varying angles so as to suit requirements.

If it is desired to lift the carriage or work-holder clear of the table F² so as to permit the latter to be used for other purposes, as for instance by mounting vise jaws on the table for which it is particularly adapted, the U-shaped frame K is disconnected from the bracket A by removing the bolt K², when the whole apparatus can be turned about the pivot N' as indicated in dotted lines in Fig. 1. The rear end of the rod M will then drop into a hole A² which is formed in the extension A' of the bracket A, and the apparatus will thereby be retained in its raised position and the table F² will then be left clear for use with the vise or otherwise as found desirable. In order to prevent the rod M when thus raised from sliding beyond a limited extent into the hole A² a pin M' can be passed through the rod so as to act as a stop in the manner shown.

As will be apparent in this construction it is necessary for the adjustable member C to be fixed so that the table F² lies substantially horizontally when the traveling carriage is to be used. In this form of the invention the work-holder has imparted to it a truly parallel movement as it reciprocates.

In the modified construction shown in Fig. 3 the work-holder is mounted so as to swing radially about the rear part of the fixed bracket A. In this case a bar Q is fixed about the center of its length in the block N which as in the previously described construction is pivoted to a forked lug which can swivel on the rear part A' of the fixed bracket. To the ends of this bar Q are pivoted the rear ends of two links R whose forward ends are similarly pivoted to the ends of a bar R' which lies parallel to the bar Q. The bar R' carries about the center of its length a tray or other work-holder P which is preferably arranged in some convenient manner so that it may be adjusted as to height and angle. A rod M extends across the center of the articulated frame formed by the bars Q and R' and the links R and the ends of the rod M are pivoted respectively to the block N and to the bar R'. Freely sliding on the rod M is a block O which carries a downwardly directed pin O' adapted to engage a hole formed in the table F² and thus to constitute a crank-pin. The arrangement is such that as the table F² rotates the work-holder will swing to and fro about the pivot centers of the links R and the rod M. If it is desired to employ the table for other purposes, as for example with a vise whose jaws can be mounted thereon, the whole apparatus may be lifted as in the construction previously described and turned about the pivot hinge between the block N and the lug $N^2$. The apparatus may be kept in its raised position by means of a bolt or pin $M^2$ which is carried within the rod M so that it can slide out from the rear end thereof and enter the hole $A^2$ and thus retain the whole in the same way as in the construction shown in Fig. 1.

With either construction it will be seen that the raising and lowering of the apparatus is a simple process, and the engagement or disengagement of the crank-pin O' and the table $F^2$ is effected practically automatically, so that the change from the reciprocating work-holder to the vise or other device which may be mounted on the rotatable table can be easily and quickly accomplished.

Alternatively in either construction the crank-pin O' may be carried on the table $F^2$ and coupled to the swinging or reciprocating frame by a connecting rod suitably disposed and joined to the respective parts in a detachable manner. When the frame which carries the work-holder is lowered into position the step-by-step rotation of the table will cause a step-by-step movement of the work-holder first in one direction and then in the other.

The details of construction may be modified to suit requirements and the nature of the work with which the device is to be employed. As all parts may be plainly and solidly constructed without springs, no portion of the apparatus is liable to suffer by the heat to which it may be subjected if used in operations in which considerable heat is required.

What I claim as my invention and desire to secure by Letters Patent is:—

1. In a work holding device, the combination of a fixed bracket, a member mounted on the bracket so that its angle of inclination relatively to the bracket can be adjusted, a member rotatably carried on the adjustable member, treadle-operated mechanism by means of which the rotatable member can be turned in either direction irrespective of the angular position of the adjustable member, a work holder, mechanism actuated by the rotatable member as it rotates whereby the work holder is caused to travel to and fro, and means for guiding the work holder as it is thus moved as set forth.

2. In a work holding device, the combination of a fixed bracket, a member mounted on the bracket so that its angle of inclination relatively to the bracket can be adjusted, a member rotatably carried on the adjustable member, treadle-operated mechanism by means of which the rotatable member can be turned in either direction irrespective of the angular position of the adjustable member, a work holder, mechanism actuated by the rotatable member as it rotates whereby the work holder is caused to travel to and fro, means for disconnecting this mechanism from the rotatable member and enabling it and the work holder to be raised clear of the rotatable member, and means for guiding the work holder as it is moved to and fro as set forth.

3. In a work holding device, the combination of a fixed bracket, a member mounted on the bracket so that its angle of inclination relatively to the bracket can be adjusted, a member rotatably carried on the adjustable member, treadle operated mechanism by means of which the rotatable member can be turned in either direction irrespective of the angular position of the adjustable member, a work holder, mechanism actuated by the rotatable member as it rotates whereby the work holder is caused to travel to and fro, means for guiding the work holder as it is thus moved, and means for adjusting the height and angular position of the work holder as set forth.

4. In a work holding device, the combination of a fixed bracket, a member mounted on the bracket so that its angle of inclination relatively to the bracket can be adjusted, a member rotatably carried on the adjustable member, treadle operated mechanism by means of which the rotatable member can be turned in either direction irrespective of the angular position of the adjustable member, a work holder, a rod extending over the rotatable member and connected toward one end to the fixed bracket so that the rod can oscillate about this connection, a connection between the other end of the rod and the work holder, a pivot connection between the rod and the rotatable member by means of which the rod is oscillated as the member rotates, and means for guiding the work holder as the rod oscillates as set forth.

5. In a work holding device the combination of a fixed bracket, a member mounted on the bracket so that its angle of inclination relatively to the bracket can be adjusted, a member rotatably carried on the adjustable member, treadle operated mechanism by means of which the rotatable member can be turned in either direction irrespective of the angular position of the adjustable member, a work holder, a rod extending over the rotatable member and connected toward one end to the fixed bracket so that the rod can oscillate about this connection, a connection between the other end of the rod and the work holder, a pin constituting a crank pin and serving as a connection between the rotatable member and the rod such that the latter will be oscillated as the member rotates, and means for guiding the work holder as the rod oscillates as set forth.

6. In a work holding device the combination of a fixed bracket, a member mounted on the bracket so that its angle of inclination relatively to the bracket can be adjusted, a member rotatably carried on the adjustable member, treadle operated mechanism by means of which the rotatable member can be turned in either direction irrespective of the angular position of the adjustable member, a work holder, a rod extending over the rotatable member and connected toward one end to the fixed bracket so that the rod can oscillate about this connection, a connection between the other end of the rod and the work holder, a block mounted on the rod so that it can slide thereon and provided with a projecting pin adapted to engage a hole in the rotatable member, and means for guiding the work holder as the rod oscillates as set forth.

7. In a work holding device the combination of a fixed bracket, a member mounted on the bracket so that its angle of inclination relatively to the bracket can be adjusted, a member rotatably carried on the adjustable member, treadle operated mechanism by means of which the rotatable member can be turned in either direction irrespective of the angular position of the adjustable member, a work holder, a rod extending over the rotatable member, a hinged and pivoted connection between this rod toward one end thereof and the fixed bracket such that the rod can oscillate about this connection and also be turned upward into a position clear of the rotatable member, a connection between the other end of the rod and the work holder, a pivot connection between the rod and the rotatable member by means of which the rod is oscillated as the member rotates, and means for guiding the work holder as the rod oscillates as set forth.

8. In a work holding device, the combination of a fixed bracket, a member mounted on the bracket so that its angle of inclination relatively to the bracket can be adjusted, a member rotatably carried on the adjustable member, treadle operated mechanism by means of which the rotatable member can be turned in either direction irrespective of the angular position of the adjustable member, a work holder, a rod extending over the rotatable member and connected toward one end to the fixed bracket so that the rod can oscillate about this connection, an adjustable connection between the other end of the rod and the work holder, a pin constituting a crank pin and serving as a connection between the rotatable member and the rod such that the latter will be oscillated as the member rotates, and means for guiding the work holder as the rod oscillates as set forth.

9. In a work holding device the combination of a fixed bracket, a member mounted on the bracket so that its angle of inclination relatively to the bracket can be adjusted, a member rotatably carried on the adjustable member, treadle-operated mechanism by means of which the rotatable member can be turned in either direction irrespective of the angular position of the adjustable member, a work holder, a rod extending over the rotatable member, a hinged and pivoted connection between this rod toward one end thereof and the fixed bracket such that the rod can oscillate about this connection and also be turned upward into a position clear of the rotatable member, a connection between the other end of the rod and the work holder, a block mounted on the rod so that it can slide thereon and provided with a projecting pin adapted to engage a hole in the rotatable member, and means for guiding the work holder as the rod oscillates as set forth.

10. In a work holding device, the combination of a fixed bracket, a member mounted on the bracket so that its angle of inclination relatively to the bracket can be adjusted, a member rotatably carried on the adjustable member, treadle-operated mechanism by means of which the rotatable member can be turned in either direction irrespective of the angular position of the adjustable member, a work holder, a rod extending over the rotatable member, a hinged and pivoted connection between this rod toward one end thereof and the fixed bracket such that the rod can oscillate about this connection and also be turned upward into a position clear of the rotatable member, an adjustable connection between the other end of the rod and the work holder, a block mounted on the rod so that it can slide thereon and provided with a projecting pin adapted to engage a hole in the rotatable member, and means for guiding the work holder as the rod oscillates as set forth.

11. In a work-holding device, the combination of a fixed bracket, a member mounted on the bracket so that its angle of inclination relatively to the bracket can be adjusted, a member rotatably carried on the adjustable member, treadle-operated mechanism by means of which the rotatable member can be turned in either direction irrespective of the angular position of the adjustable member, a rod extending over the rotatable member, a hinged and pivoted connection between this rod toward one end thereof and the fixed bracket such that the rod can oscillate about this connection and also be turned upward into a position clear of the rotatable member, a block mounted on the rod so that it can slide thereon and provided with a projecting pin adapted to engage a hole in the rotatable member, a guide detachably connected to the fixed bracket, a member which can slide on this guide, a pivoted connection between this member and the forward end of the rod, and a work-holder adjustably mounted on this member, as set forth.

In testimony whereof I have signed my name to this specification.

ALBERT RICHARD JAMES WILKINSON.

Witnesses:
 EDWARD A. LEADAM,
 AUSTIN FRIAN.